April 21, 1925. 1,534,987
J. N. A. O'REAR
WHEEL ATTACHMENT FOR MOTOR VEHICLES
Filed Jan. 11, 1924
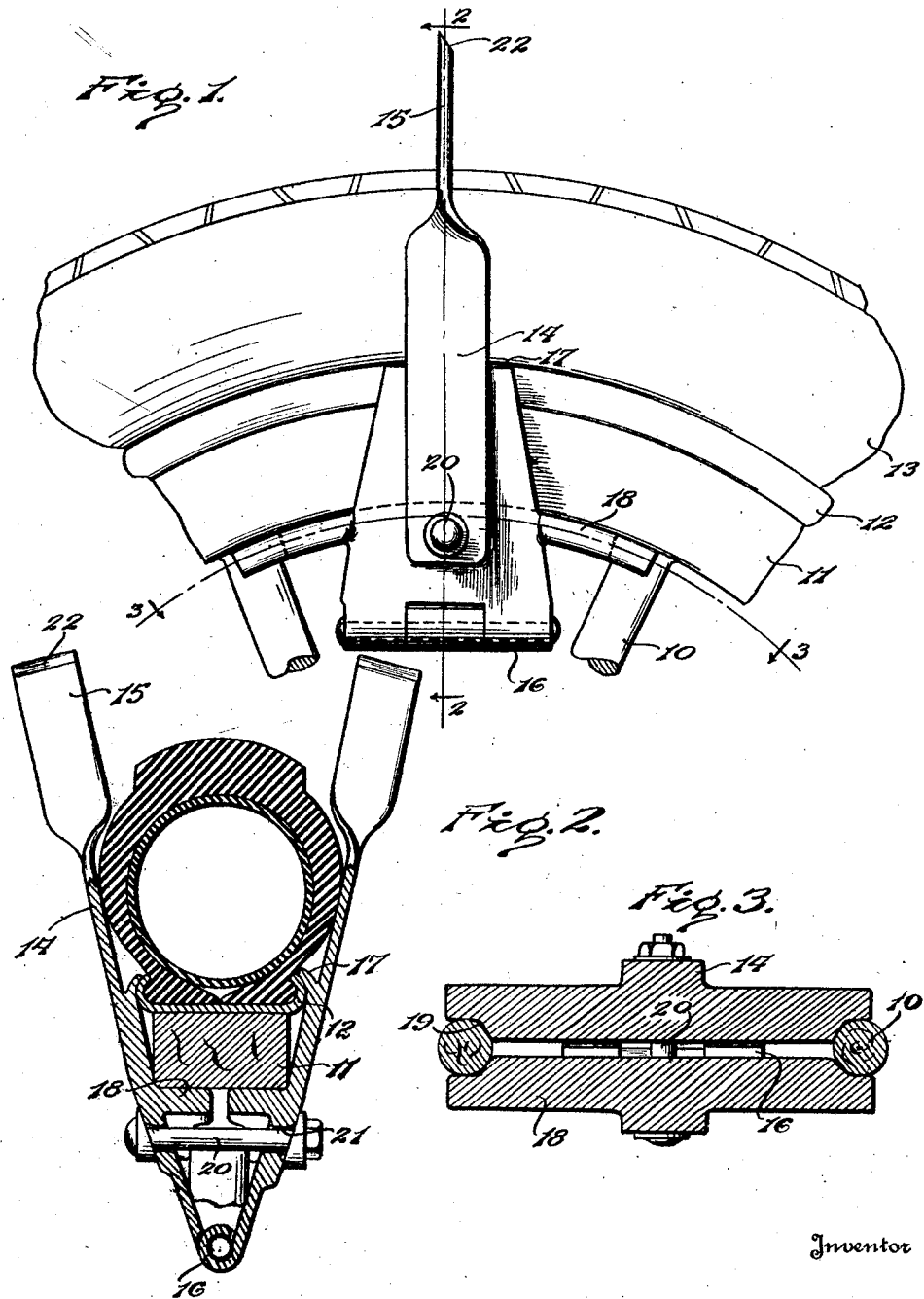
Inventor
J.N.A. O'Rear
By
Lacey Lacey, Attorneys Patented Apr. 21, 1925.

1,534,987

UNITED STATES PATENT OFFICE.

JIM N. A. O'REAR, OF ATTALLA, ALABAMA, ASSIGNOR OF ONE-THIRD TO LILIUS BRATTON RAINEY, OF GADSDEN, ALABAMA.

WHEEL ATTACHMENT FOR MOTOR VEHICLES.

Application filed January 11, 1924. Serial No. 685,620.

*To all whom it may concern:*

Be it known that I, JIM N. A. O'REAR, a citizen of the United States, residing at Attalla, in the county of Etowah and State of Alabama, have invented certain new and useful Improvements in Wheel Attachments for Motor Vehicles, of which the following is a specification.

My invention relates to an attachment for the rear or driving wheels of a motor vehicle and the main object of the invention is to provide means for pulling the vehicle out of ruts and mud, or uphill, particularly on icy roads.

By furnishing a vehicle with several of these attachments the driving wheels are practically converted to tractor wheels and it will thus be evident that the vehicle can be propelled over otherwise impassable parts of the road.

In the accompanying drawing one embodiment of the invention is illustrated, and;

Figure 1 is a fragmentary side elevation of a vehicle wheel with the device attached;

Figure 2 is a section along line 2—2 of Figure 1; and

Figure 3 is a section along line 3—3 of Figure 1, that is to say, in a circumferential plane of the wheel.

In the drawing, reference numeral 10 represents the spokes of an ordinary wheel, 11 the felly, 12 the rim, and 13 the pneumatic tire. It will be evident, however, that the device is applicable to wheels with solid tires whether of rubber or metal.

The wheel attachment consists of two shanks 14 adapted to straddle the wheel rim and extend beyond the tread surface of the pneumatic tire 13. The free ends of the shanks 14 are flattened as at 15 presenting broad surfaces in the circumferential direction of the wheel and the edges are preferably beveled as at 22 presenting a sharp edge on the driving side of the wheel. The inner ends of the shanks are joined together by a hinge 16 permitting the spreading out of the shanks to pass outwardly over the pneumatic tire 13.

The shanks 14 are provided with ledges 17 adapted to engage the rim 12 and are for that purpose suitably curved, as best seen in Figure 2. These ledges 17 are preferably wider than the shanks, in order to get a good hold on the rim.

On each shank and near the hinged portion thereof are furnished arms 18, which are of arcuate shape to conform with the inner periphery of the felly 11, and adapted to rest thereon when in position. The overall length from end to end of the arms 18 is a little more than the distance between two adjacent spokes 10 on the wheel and the ends of the arms are recessed as at 19 to engage half around the spokes when in position. This steadies the device not only in transverse direction, but also in circumferential direction of the wheel.

A clamping bolt 20 engages in suitable apertures 21 in the shanks and is adapted to draw the latter together and to firmly hold them in position, as seen in Figure 2. When assembled in this manner, the arms 18 rest upon the inner periphery of the felly 11, while the ledges 17 curving partly around the rim 12, draw the shanks outwardly in radial direction, the arms 18 at the same time engaging between two adjacent spokes 10.

With several of these attachments secured on the driving wheel, the flat blades 15 at the outer ends of the shanks 17 will take good hold in the ground and raise the vehicle out of a rut, or drive it up a hill without difficulty. On account of the very simple construction of this device, it can be manufactured at a very small cost. It may be cast or drop-forged and is preferably made of malleable iron.

It is evident that still another use of the device is possible, namely, as a safety device against theft, when the automobile is parked on a hard roadway or street, as it would then be rather difficult to run away with the vehicle with this attachment clamped and locked to the driving wheels.

It is evident that the wheel attachment may be made either as a metal casting or forging as found most suitable.

Having thus described the invention what is claimed as new is:

1. A wheel attachment of the class described comprising a pair of hinged shanks terminating with flattened blades at their free ends, and means for clamping the shanks to the wheel, said means including circumferentially extending arms having abutments adapted to engage with the periphery of the whole felly.

2. A wheel attachment of the class described comprising a pair of hinged shanks terminating with flattened blades at their free ends, means for clamping the shanks to the wheel, said means including opposing gripping ledges on said shanks adapted to engage with the wheel rim, and circumferentially extending arms having abutments adapted to engage with the inner periphery of the wheel felly.

3. A wheel attachment of the class described comprising a pair of hinged shanks terminating with flattened blades at their free ends, means for clamping the shanks to the wheel, said means including opposing gripping ledges on said shanks adapted to engage with the wheel rim, and circumferentially extending arms having abutments adapted to engage with the inner periphery of the wheel felly, said arms having suitable recesses engaging with the spokes of the wheel.

4. A wheel attachment of the class described comprising a pair of hinged shanks terminating with flattened blades at their free ends, means for clamping the shanks to the wheel, said means including opposing gripping ledges on said shanks adapted to engage with the wheel rim, circumferentially extending arms having abutments adapted to engage with the inner periphery of the wheel felly, said arms having suitable recesses engaging with the spokes of the wheel, and a transversely running clamping bolt through said shanks.

5. A wheel attachment of the class described comprising a pair of hinged shanks terminating with flattened blades at their free ends, and means for clamping the shanks to the wheel, said means including circumferentially extending arms having abutments adapted to engage with the inner periphery of the wheel felly.

6. A wheel attachment of the class described comprising a pair of hinged shanks terminating with flattened blades at their free ends, and means for clamping the shanks to the wheel, said means including circumferentially extending arms having abutments adapted to engage with the inner periphery of the wheel felly, said arms having suitable recesses engaging with the spokes of the wheel.

In testimony whereof I affix my signature.

JIM N. A. O'REAR. [L. s.]